Figure 1:
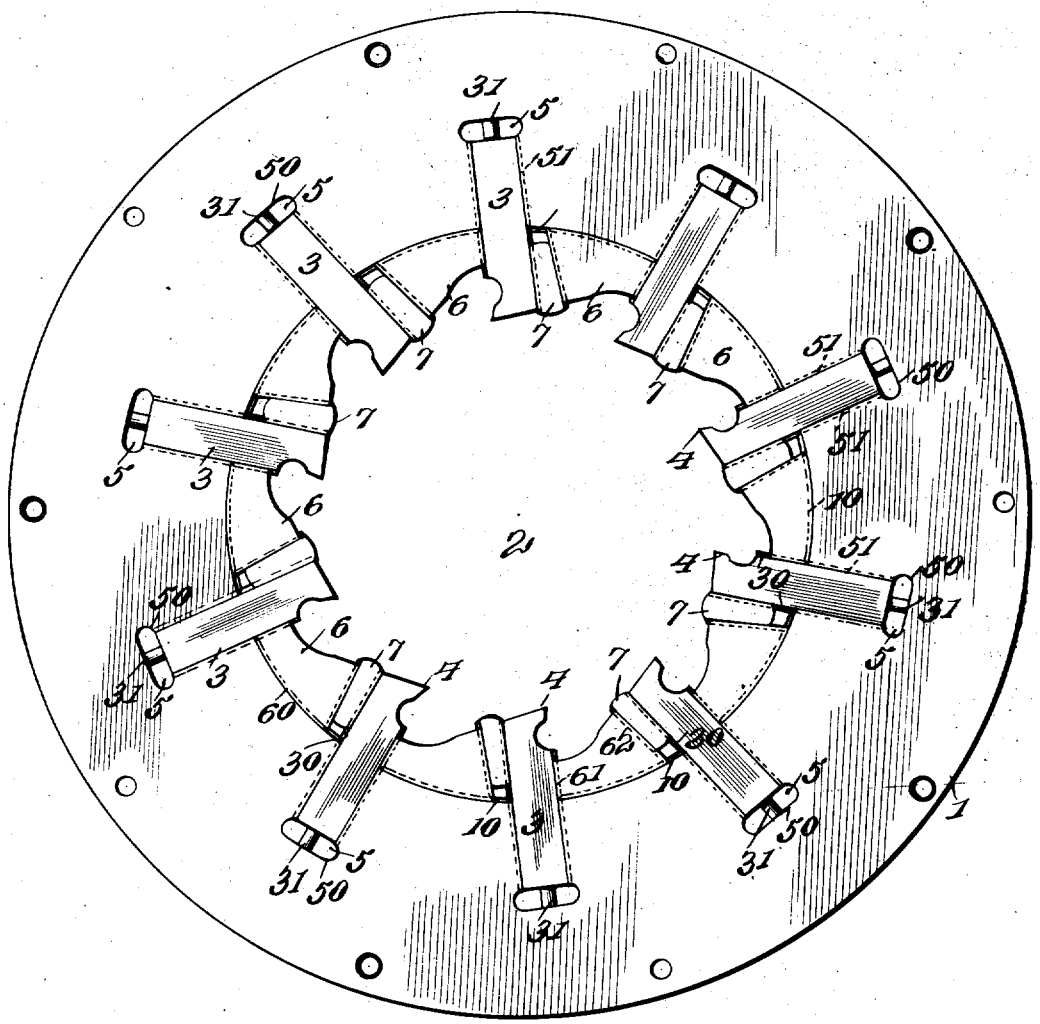

G. GORTON & C. R. CARPENTER.

METAL CUTTING-OFF DEVICE AND THE LIKE.

APPLICATION FILED JUNE 21, 1912.

Reissued Aug. 20, 1912.

4 SHEETS—SHEET 1.

13,458.

Witnesses

W. A. Williams

C. P. Wright, Jr.

Inventors

George Gorton

Charles R. Carpenter

By Hubert E. Peck

Attorney

G. GORTON & C. R. CARPENTER.
METAL CUTTING-OFF DEVICE AND THE LIKE.
APPLICATION FILED JUNE 21, 1912.
Reissued Aug. 20, 1912.
4 SHEETS—SHEET 2.
13,458.
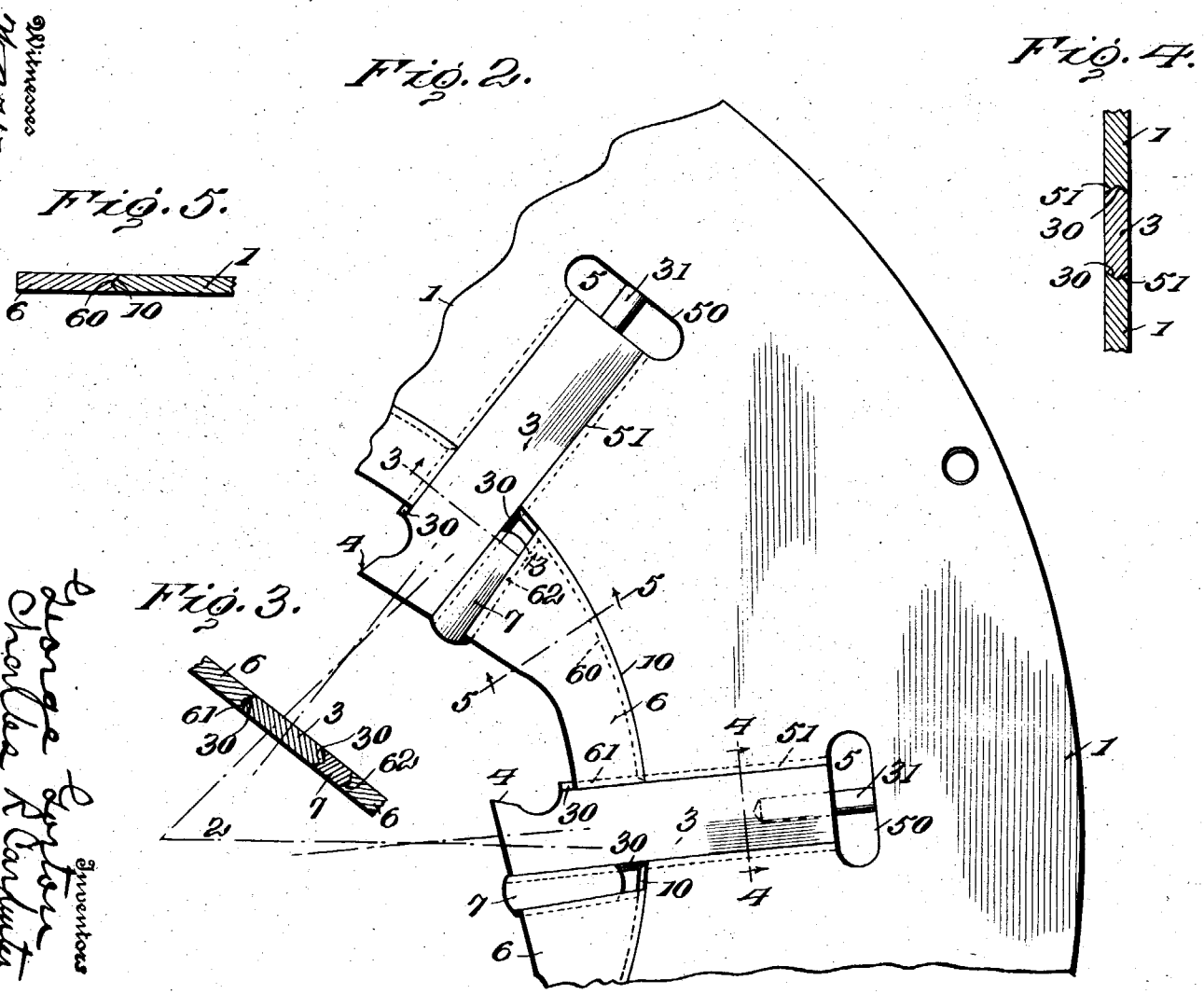
Witnesses
W. A. Williams
C. P. Wright Jr.
Inventors
George Gorton
Charles R. Carpenter
By Hubert E. Peck
Attorney G. GORTON & C. R. CARPENTER.
METAL CUTTING-OFF DEVICE AND THE LIKE.
APPLICATION FILED JUNE 21, 1912.
Reissued Aug. 20, 1912.
4 SHEETS—SHEET 3.
13,458.
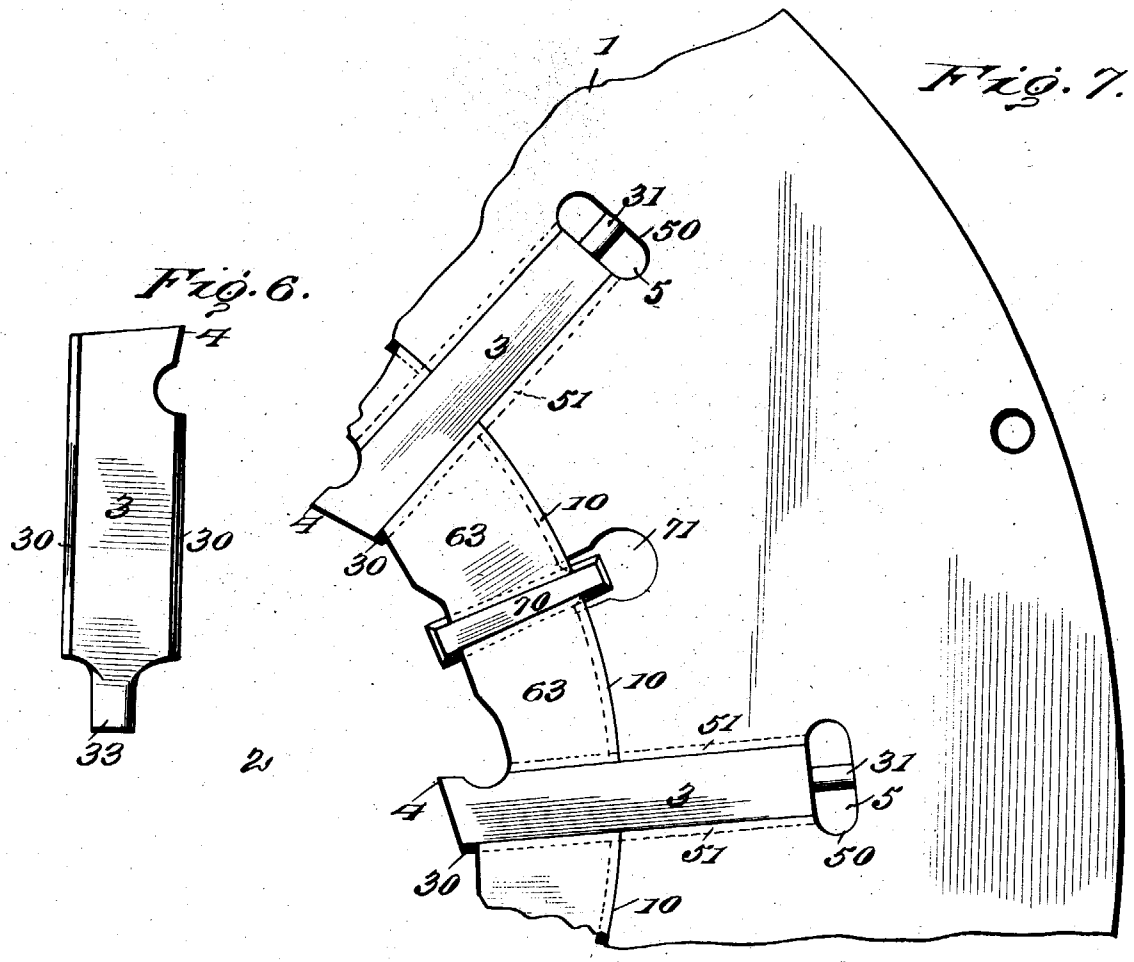
Witnesses
W. A. Williams
C. R. Wright Jr.
Inventors
George Gorton
Charles R. Carpenter
By Hubert Peck
Attorney

G. GORTON & C. R. CARPENTER.

METAL CUTTING-OFF DEVICE AND THE LIKE.

APPLICATION FILED JUNE 21, 1912.

4 SHEETS—SHEET 4.

Reissued Aug. 20, 1912.

13,458.

Witnesses

W. A. Williams

C. R. Wright Jr.

Inventors

George Gorton

Charles R. Carpenter

By Hulbert & Beck

Attorney

UNITED STATES PATENT OFFICE.

GEORGE GORTON AND CHARLES R. CARPENTER, OF RACINE, WISCONSIN; SAID CARPENTER ASSIGNOR TO SAID GORTON.

METAL-CUTTING-OFF DEVICE AND THE LIKE.

13,458. Specification of Reissued Letters Patent. Reissued Aug. 20, 1912.

Original No. 1,028,846, dated June 4, 1912, Serial No. 567,109. Application for reissue filed June 21, 1912. Serial No. 705,040½.

*To all whom it may concern:*

Be it known that we, GEORGE GORTON and CHARLES R. CARPENTER, citizens of the United States, residing at Racine, Racine county, Wisconsin, have invented certain new and useful Improvements in and Relating to Metal-Cutting-Off Devices and the Like; and we do hereby declare the following to be a full, clear, and exact description of the invention, such as will enable others skilled in the art to which it appertains to make and use the same.

This invention relates to certain improvements in and relating to metal cutting-off devices and the like; and the objects and nature of the invention will be readily understood by those skilled in the art in the light of the following explanation of the accompanying drawings which illustrate what we now consider our preferred embodiment from among other formations and arrangements within the spirit and scope of the invention.

An object of the invention is to include the several inwardly directed renewable or insertible cutters, arranged around the central bore or opening of an internal rotary cutter or saw drum or blade, in an endless thrust-receiving-and-distributing or strain-sustaining circuit, annulus or ring formed separately from said blade but coupled thereto at intervals, or otherwise, and arranged completely around the bore of the blade to distribute the thrust of any cutter in action completely around said circuit and the blade bore, and to avoid at any instant concentrating the strain of the cutter in action on any particular portion of the blade.

A further object of the invention is to provide an internal rotary metal-cutting-off device with renewable cutters around the bore of a rotary blade or drum and to so arrange the same that the strain and thrust on each cutter in action will be transmitted and distributed to the other cutters around the circle of the bore, and to protect the rotary blade against injury from and by the breakage of cutters.

A further object of the invention is to so arrange and secure cutters to a rotary blade as to constitute a continuous thrust-sustaining ring or circuit formed separately from the blade and comprising renewable hard metal portions distributing the thrust around said circuit and protecting the blade from injury due to breakage of cutter working points or ends.

A further object of the invention is to provide certain improvements in arrangements and formations of parts as to produce a highly efficient high-speed metal-cutting-off device having a central work receiving bore or opening.

The invention consists in certain novel features in construction and in combinations and arrangements of parts as more fully and particularly set forth hereinafter.

Figure 8:
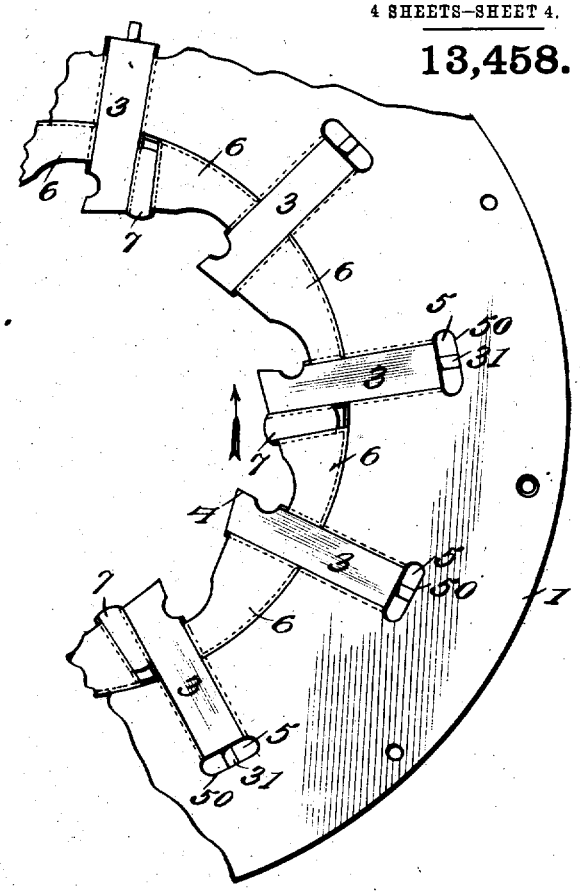

Referring to the accompanying drawings; Figure 1, is an elevation of an internal saw embodying the invention. Fig. 2, is an elevation of a portion thereof on an enlarged scale. Fig. 3, is a section of the line 3—3, Fig. 2. Fig. 4, is a section on the line 4—4, Fig. 2. Fig. 5, is a section on the line 5—5, Fig. 2. Fig. 6, is a detail elevation of a modified form of cutter showing the outer end stop formed by an extension integral with the cutter. Fig. 7, is an elevation of a portion of a saw showing a modification. Fig. 8, is an elevation of a modification.

This invention is particularly intended for use in connection with so-called high duty or high speed steel cutters in cutting-off machine saws or rotary blades having central work receiving openings or bores surrounded by the renewable cutters. These internal rotary cutting off devices constitute a drive whereby such cutters can be driven and fed approximately to their capacity and consequently are worked at very high rates of speed and subject the blade and cutters to enormous strains and thrust, tending sometimes to breakage of the working ends of the cutters. These cutters are usually wedged tightly in separate pockets in the blade in such manner that the thrust of a cutter in action is concentrated on the portion of the blade receiving the same, and the breakage of a cutter forces the broken portion back against the blade and results in "bell-mouthing" or flaring of the blade pocket receiving such cutter and serious damage of the blade, as is well understood by those skilled in the art. To avoid these objections, we arrange a ring of abutting thrust-receiving elements around the bore or central opening of the blade, and separate therefrom, but fitted to the surrounding edge thereof, certain of said elements entering spaced pockets in the blade to couple the ring of elements thereto, said elements including the uniformly-spaced inwardly projecting cutters, and locking or wedging means whereby the ring of abutting thrust-receiving elements are tightened and locked together and to the blade. The arrangement is such that the thrust of the cutters is distributed from element to element around the ring and thus to all of the blade pockets, and concentration of the thrust on any one pocket is prevented, and the breakage of a cutter working-end will not result in driving the broken part back against a pocket or against an edge of the blade, but one of said abutting elements will receive the blow and brunt of the broken part and thus protect the blade itself from injury. Certain of these abutting thrust-receiving elements at uniformly spaced intervals within the circle formed by said elements, constitute the inwardly projecting cutters, and the ring of thrust elements is locked or coupled to the blade to be driven thereby and rotated therewith, through the medium of certain thrust elements projecting outwardly into and fitting in pockets formed in the rotary blade and uniformly spaced around the central bore thereof, and these pockets can be arranged to receive thrust elements constituting the cutters, or intervening thrust elements forming locking or tightening wedges, or other thrust elements not constituting either cutters or wedges.

What we now consider the preferred construction provides a simple and advantageous method of cutter radial adjustment by grinding. In this preferred embodiment, the cutters fit in the pockets in the rotary blade and the stop floors or outer end walls of these pockets are all accurately located the same distance from the center or axis of rotation. The cutter abutments or stops are fixed or permanent parts of the cutters and bear against the stop floors or end walls of the blade pockets. The cutters are sharpened by grinding away sufficient stock from their cutting ends to produce the desired edge. After all of the cutters for a blade have been sharpened the entire set of cutters is placed in a suitable holder having proper gages. The holder can then be moved up to a plane surface grinder to cause all of the cutter abutments to touch the grinding surface whereby all of the abutments will be brought accurately to the same plane, and all like cutters will be absolutely of the same length. A fixed radial permanent adjustment is thus attained by grinding the fixed rear ends or abutments of the cutters, thereby avoiding the necessity of separately adjusting each cutter through the medium of inaccurate screw threaded devices.

In the drawings, we show certain specific examples of structures for accomplishing the results hereinbefore recited, but do not attempt to illustrate all of the different formations which can be followed under our invention.

In the drawings, 1, is a metal-cutting saw blade having a central work receiving opening or bore 2, surrounded by a circle of uniformly-spaced renewable, removable or insertible cutters 3, having working ends or points 4, projecting into the central bore or opening of the saw, and preferably composed of "high speed" metal, such as steel or an alloy thereof, as will be understood by those skilled in the art.

In the specific construction illustrated, the saw blade is formed with a series of uniformly spaced radiating pockets 5, at their inner ends opening into the central bore of the saw blade. The floors or flat edge walls 50, closing the outer ends of these pockets are all at the same distance from the center of the blade bore 2, that is, these walls 50, are all in one circle concentric with the axis of rotation of the saw blade.

The side walls 51 of each pocket are preferably parallel and longitudinally either grooved or ribbed, although in the present instance, we show them grooved, by forming them V-shaped in cross section. The edges 10, of the blade surrounding the bore 2, thereof, and intervening between the pockets 5, are also preferably longitudinally grooved or ribbed, although in the present instance we show them ribbed by forming them inverted V-shaped in cross section.

Each cutter 3, in the particular examples illustrated, is oblong in formation and of considerably greater length than the depth of any pocket 5, and has its parallel longitudinal edges 30, longitudinally ribbed to longitudinally enter and fit in the edge walls 51, of any pocket, and be held thereby against lateral deflection from the plane of the blade. The outer end of each cutter is formed with a stop 31, to engage the outer end floor of the pocket receiving the same, and thereby gage the projection of the working point of the cutter into the bore of the blade. The projection of the working points of the cutters into the bore of the saw blade is determined or adjusted by grinding off the ends of the abutments or stops 31. This can be accomplished by utilizing a suitable gage to determine that the set of cutters for a blade are all of the desired length, or lengths, and if not to make them of the necessary length by removing stock from the ends of the stops 31. The stops 31, can be formed by pins fixed in and projecting from the outer ends of the cutters, as in Fig. 2, or integral projecting portions 33, of the cutters can form said stops as in Fig. 6.

Substantial portions of the lengths of the cutters project inwardly beyond the pockets 5, in the blade, and suitable thrust blocks, inserts or cutter wedging, locking or tightening elements are interposed between the said inwardly projecting portions of the cutters and around the central opening of the blade to form the continuous thrust receiving and distributing circle or ring which includes the cutters and is in effect separate from the blade. Various formations and constructions of cutters and intervening elements can be provided for this purpose, to produce a formation wherein the series of cutters directly or indirectly abut completely around the saw blade bore in-so-far as the transmission of strain or thrust is concerned from the cutter in action around the series back to the front face of said cutter.

In the particular example illustrated by Fig. 1, the thrust elements between the elements constituting the cutters, consist of thrust blocks 6 and tightening or locking keys or wedges 7. The blocks 6, and wedges 7, are composed of very hard tough steel and are of approximately the same thickness as the blade and body part of the cutters. The longitudinally convexed outer edges 60, of the blocks 6, are centrally depressed or grooved to fit on and receive the ribbed edges 10, of the blade 1, intervening between the pockets. The radial rear end edges 61 of these blocks abut against the front edges 30 of the cutters and are longitudinally grooved to receive said ribbed cutter edges 30. The front radial end edges 62, of these blocks terminate short of the rear edges of the cutters to leave spaces for the reception of the radial tightening or locking wedges 7, which are driven in between the rear edges of the cutters and the front edges of the blocks 6; the front longitudinal edges of the wedges being grooved to receive the ribbed edges 30, of the cutters, and the rear longitudinal edges of the wedges being ribbed to enter the grooved front edges of the blocks. The blocks are reduced in radial width rearwardly to avoid interference with the cutting action of the working inner front edges of the cutters, while the blocks are increased forwardly in radial width so that their front ends will support the wedges practically throughout the full lengths of the inwardly projecting portions thereof. If so desired, every alternate thrust block 6, could form a complete filler from cutter to cutter without the wedge 7, while the intervening blocks 6, could have the wedges interposed between their front ends and the cutters to lock the entire ring of abutting thrust elements rigidly together, see Fig. 8, but such an arrangement would require more accurate construction than the arrangement of Fig. 1, wherein a wedge backs every cutter.

In Fig. 7, we show two thrust blocks 63, and an intervening radial wedge 70, interposed between each pair of cutters, the blade being recessed at 71, to receive the outer end of the wedge. In all of these arrangements, the abutting thrust elements are interchangeable and removable and if any element is damaged it can be removed and a perfect element susbtituted and the ring can then be again accurately tightened up by the wedges in readiness for action.

The thrust elements are preferably composed of very hard steel to avoid compression under the tremendous thrust of the cutters and hence tend to more rigidly hold the cutters and thereby reduce danger of the breakage thereof, and furthermore, to stand the strain of the cutters and transmit the same around the ring of abutting thrust elements and thereby relieve the blade. If a cutter should break, a thrust element will receive the blow and shock thereof, protecting the blade pocket from injury, and if the thrust element is injured by the broken piece of the cutter, such element can be renewed at comparatively slight expense. The thrust elements are held together and to the blade against lateral deflection from the plane of the blade by interlocking or intermeshing tongue and grooved or beveled and depressed edges, but of course we do not wish to limit the invention to the exact edge formations shown in the drawings.

We do not herein broadly claim a rotary blade adapted to be secured around and exteriorly driven from its peripheral portion and having a central work receiving opening and cutter pockets uniformly spaced around and opening thereinto, in combination with cutters adapted to said pockets and having inner high duty working points within said opening, and means for rigidly and removably locking said cutters to said blade to sustain the thrust thereof, for such structure is claimed in the co-pending sole application of George Gorton, S. No. 512,337 filed August 11, 1909, for cutting off saws.

It is evident that within the scope of the claims various changes, variations, and modifications might be resorted to and hence we do not wish to limit ourselves to the exact disclosures hereof.

What we claim is;

1. A rotary member having a central work-receiving bore formed with pockets spaced around and opening into said bore, and a circular series of separate removable abutting thrust-elements confined to said member and arranged around said bore, and including inwardly projecting cutters, certain of said elements fitting said pockets, said series of abutting elements backing the inner working ends of said cutters.

2. A rotary member having a central work receiving bore, and a ring of abutting thrust elements separable from said member and coupled to and driven thereby and arranged around said bore and interlocking together and with the edge of said member against lateral deflection from the plane thereof, said elements including inwardly projecting cutters, and tightening wedges.

3. A rotary blade having a central work receiving opening and a continuous series of abutting thrust-elements removably locked to said blade and around said opening and including projecting cutters, and tightening wedges, substantially as described.

4. A rotary blade having uniformly spaced edge pockets, and a continuous series of separable abutting thrust elements removably coupled to and driven by said blade and arranged completely around the same, certain of said elements fitted in said pockets, said elements including projecting cutters, thrust blocks and locking means.

5. A rotary blade provided with removable cutters, and removable abutting thrust elements arranged between said cutters and receiving the thrust thereof and transmitting the same throughout the series of elements and cutters and comprising tightening and wedging means, substantially as described.

6. A rotary blade provided with projecting removable cutters interlocking therewith against lateral deflection therefrom, and intervening series of separate removable abutting thrust elements interlocking with said cutters and blade against lateral deflection and including tightening wedges, said elements and cutters transmitting the thrust of the cutters in action and distributing the same around the blade.

7. A rotary blade having projecting removable cutters, and separate removable thrust blocks and wedges interposed around the blade between the projecting portions of the cutters and distributing the thrust of the cutters in action throughout the series of blocks, wedges and cutters.

8. A rotary blade having a central bore and formed with spaced radial pockets arranged around said bore, and a ring of separate removable abutting thrust elements arranged around said bore with certain of said elements fitted in said pockets to drive the ring of elements with the blade, said elements interlocking with each other at their edges against lateral deflection, and interlocking with the edges of the blade against lateral deflection, said elements comprising projecting cutters, thrust blocks and radially arranged tightening wedges.

9. A rotary blade having a central bore and spaced radial pockets arranged around and opening into said bore, abutting thrust elements forming a ring around said bore with certain of said elements projecting outwardly and removably fitted in said pockets and other of said elements removably fitting the edges of the blade intervening between said pockets, said ring of elements being composed of separable thrust blocks, tightening wedges, and inwardly projecting cutters.

10. A rotary member having a central work receiving opening, and a ring of abutting thrust elements separable from said member and coupled to and driven thereby and arranged around said opening and interlocking together against lateral deflection, said elements including inwardly projecting cutters and tightening wedges.

11. A rotary blade having a central bore and formed with spaced radial pockets arranged around said bore, and a ring of separate removable abutting thrust elements arranged around said bore with certain of said elements fitted in said pockets to drive the ring of elements with the blade, said elements interlocking with each other at their edges against lateral deflection, and comprising projecting cutters, thrust blocks and radially arranged tightening wedges.

12. A rotary blade having a central bore and spaced radial pockets arranged around and opening into said bore, abutting thrust elements forming a ring around said bore with certain of said elements projecting outwardly and removably fitted in said pockets and other of said elements arranged along the edges of the blade intervening between said pockets and between the projecting portions of said certain elements, said ring of elements comprising inwardly projecting cutters, thrust blocks, and tightening wedges.

13. A rotary blade having a central work receiving opening with spaced pockets arranged around said opening, cutters fitted in said pockets and projecting into said opening, and series of thrust blocks and wedges arranged around the opening between the projecting inner ends of the cutters, the wedges keying the ring of cutters, blocks and wedges together, substantially as described.

14. A rotary blade having a central work receiving opening with spaced pockets arranged therearound, removable cutters fitted in said pockets and projecting inwardly therefrom, and series of thrust blocks and radially disposed wedges arranged around the opening at the edge of the blade and between the projecting inner ends of the cutters and in connection with the cutters forming a ring of abutting thrust sustaining elements, said wedges backing the cutters and interposed between the same and the blocks, the blocks engaging the front edges of the cutters.

15. A rotary blade having a central work receiving opening with spaced pockets arranged therearound, removable cutters fitted in said pockets and projecting inwardly therefrom, and series of thrust blocks and radially disposed wedges arranged around the opening at the edge of the blade and between the projecting inner ends of the cutters and in connection with the cutters forming a ring of abutting thrust sustaining elements, said wedges keying the elements of said ring tightly together and to the blade.

16. A blade having spaced cutter pockets, radially arranged cutters adapted to said pockets and projecting a substantial distance therefrom, thrust blocks arranged at the edge of the blade between the pockets, and wedges driven between cutters and blocks to tightly lock together the thrust sustaining ring formed by the cutters, blocks and wedges.

17. A metal cutting-off saw having a series of spaced cutter pockets, cutters adapted to said pockets and projecting therefrom, wedges arranged longitudinally of said cutters, and thrust blocks between said wedges and adjacent cutters, said blocks, cutters, and wedges being held keyed and abutting by said wedges, substantially as described.

In testimony whereof we affix our signatures in presence of two witnesses.

GEORGE GORTON.
C. R. CARPENTER.

Witnesses:
EARL S. GERE,
CORA ERLANDSON.